United States Patent
Li (10) Patent No.: US 9,201,522 B2
(45) Date of Patent: Dec. 1, 2015

(54) ACOUSTIC POSITION TRACKING SYSTEM

(71) Applicant: QUALCOMM Incorporated, San Diego, CA (US)

(72) Inventor: Ren Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 14/017,185

(22) Filed: Sep. 3, 2013

(65) Prior Publication Data

US 2015/0062091 A1    Mar. 5, 2015

(51) Int. Cl.
| | | |
|---|---|---|
| G06F 3/043 | (2006.01) | |
| G06F 3/0354 | (2013.01) | |
| G06F 3/038 | (2013.01) | |
| G06F 3/041 | (2006.01) | |
| G01S 5/18 | (2006.01) | |
| G01S 5/22 | (2006.01) | |

(52) U.S. Cl.
CPC ............ *G06F 3/03545* (2013.01); *G01S 5/186* (2013.01); *G01S 5/22* (2013.01); *G06F 3/038* (2013.01); *G06F 3/043* (2013.01); *G06F 3/0418* (2013.01); *G06F 3/0436* (2013.01)

(58) Field of Classification Search
None
See application file for complete search history.

(56) References Cited

U.S. PATENT DOCUMENTS

| | | |
|---|---|---|
| 4,991,148 A | 2/1991 | Gilchrist |
| 5,774,113 A | 6/1998 | Barnes |
| 7,489,308 B2 | 2/2009 | Blake et al. |
| 2008/0084789 A1 | 4/2008 | Altman |
| 2008/0128178 A1 | 6/2008 | Jia |
| 2011/0029913 A1 | 2/2011 | Boillot et al. |
| 2011/0279366 A1 | 11/2011 | Lohbihler |
| 2013/0155816 A1 | 6/2013 | Li et al. |
| 2013/0315038 A1* | 11/2013 | Ferren et al. .................. 367/197 |

FOREIGN PATENT DOCUMENTS

WO        0135329 A1    5/2001

OTHER PUBLICATIONS

International Search Report and Written Opinion—PCT/US2014/053191—ISA/EPO—Nov. 21, 2014.

* cited by examiner

*Primary Examiner* — Muhammad N Edun
(74) *Attorney, Agent, or Firm* — Haynes and Boone, LLP (57) ABSTRACT

An acoustic tracking system is provided that includes a mobile device including a plurality of receivers that receives an acoustic signal from each of three transmitters disposed in a fixed, non-planar relationship with respect to each other, where the three transmitters are coupled to a transmitting device. The system also includes a processing component that determines based on the acoustic signals received at the plurality of receivers a position of the transmitting device in a multidimensional space. The system also includes an application controller that affects operation of an application based on a determined position of one or more transmitters of the three transmitters.

34 Claims, 4 Drawing Sheets

ACOUSTIC POSITION TRACKING SYSTEM

TECHNICAL FIELD

Embodiments disclosed herein are generally directed to tracking a position of a transmitting device in an acoustic tracking system.

BACKGROUND

Acoustic signal-based position tracking systems may be used with mobile devices such as smartphones, tablets, and laptops. Moreover, acoustic signal-based position tracking systems may be used with basically any computing device that has a screen. One example of an acoustic signal-based position tracking system is a digital pen having an acoustic signal transmitter that is in communication with a receiver that is a computing device, where the digital pen is used to interact with the computing device.

A conventional acoustic signal-based position tracking system includes a transmitter that emits acoustic signals and a receiver that receives the emitted signals. The receiver measures the propagation delay, referred to as Time of Arrival ("TOA"), of the received acoustic signal, and may multiply the TOA by the speed of sound, to determine a position of the transmitter. Using multiple receivers may allow triangulation and/or another form of multilateration, and provide for the determination of a position in two or even three dimensions. A tracking system that uses TOA to determine a position may have performance limitations and have suboptimal accuracies when the transmitting device is not in contact with the computing device. Further, additional timing synchronization or sound speed estimation functions may be needed to mitigate the localization errors.

SUMMARY

There is a need for an improved acoustic tracking system that has low power requirements, does not require dedicated synchronization hardware, and is easy to implement in a variety of electronic devices.

Consistent with some embodiments, there is provided an acoustic tracking system. The acoustic tracking system includes a mobile device including a plurality of receivers that is capable of receiving an acoustic signal from each of at least three transmitters disposed in a fixed, non-planar relationship with respect to each other. The acoustic tracking system also includes a processing component that is capable of determining based on the acoustic signals received at the plurality of receivers a position of the at least three transmitters in a multidimensional space. The acoustic tracking system further includes an application controller that is capable of affecting operation of an application based on a determined position of one or more transmitters of the at least three transmitters.

Consistent with some embodiments, there is provided a method of determining a position of a transmitting device. The method includes receiving at a plurality of receivers an acoustic signal from each of at least three transmitters disposed in a fixed, non-planar relationship with respect to each other. The method also includes determining based on the acoustic signals received at the plurality of receivers a position of the at least three transmitters in a multidimensional space. The method further includes affecting operation of an application based on a determined position of one or more transmitters of the at least three transmitters.

BRIEF DESCRIPTION OF THE DRAWINGS

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Figure 1:
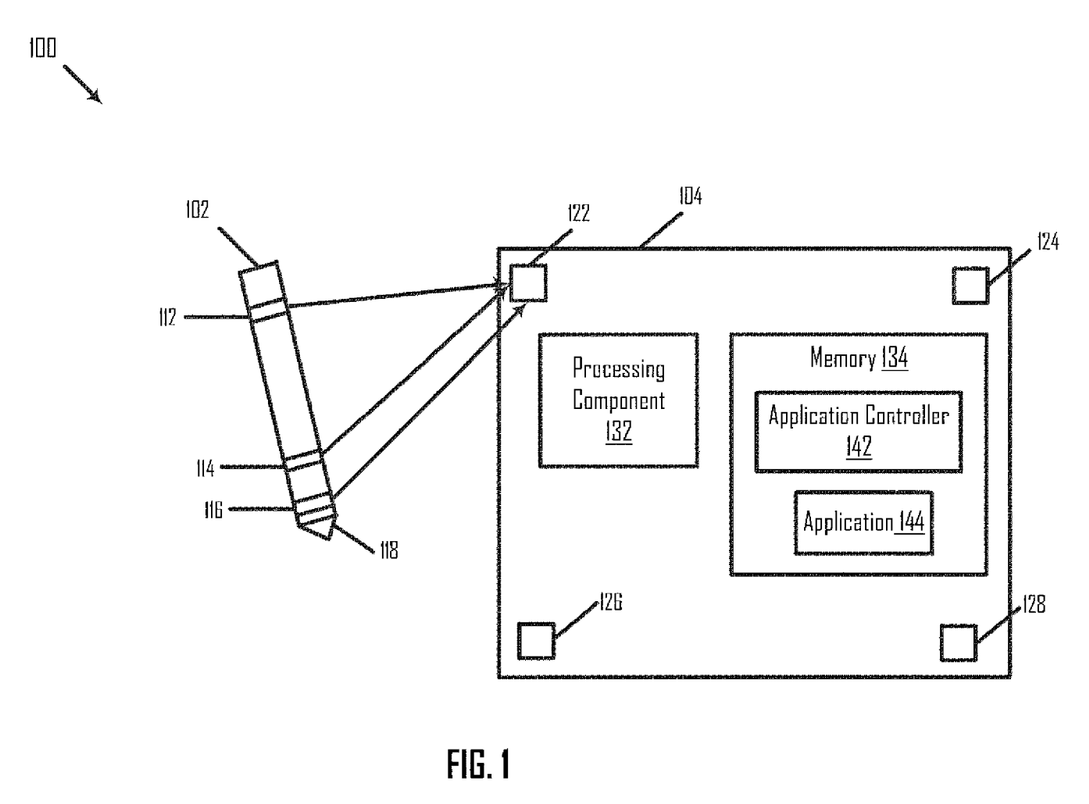
FIG. 1 is a diagram illustrating an acoustic tracking system, consistent with some embodiments.

FIG. 1 is a diagram illustrating an acoustic tracking system 100, consistent with some embodiments. As shown in FIG. 1, acoustic tracking system 100 includes a transmitting device 102 whose position is to be determined, and a receiving device 104 for picking up signals transmitted by transmitting device 102. In some embodiments, receiving device 104 may be moving while transmitting device 102 is stationary. In other embodiments, receiving device 104 may be stationary while transmitting device 102 is moving. Receiving device 104 may also be a computing device, such as a personal computer or a mobile device (e.g., a laptop, mobile smartphone, personal digital assistant, or a tablet computer).

As illustrated in FIG. 1, transmitting device 102 may be embedded, embodied, attached, or otherwise incorporated into a digital pen. The transmitting device may include a plurality of transmitters that are disposed on the digital pen. Although system 100 is described herein with reference to the transmitting device being incorporated into a digital pen, other embodiments may include a transmitting device being incorporated into an object different from a digital pen.

In FIG. 1, transmitting device 102 includes a transmitter 112, a transmitter 114, and a transmitter 116. Although three transmitters are illustrated, other embodiments having more than three transmitters are within the scope of this disclosure. In principle, more than three transmitters may be disposed on the digital pen if power, design complexity, and system robustness allow for it. More interference, however, from adjacent transmitters on the digital pen may arise and may depend on the pattern signal design. Orthogonal sequences with ideal correlation properties may be used for the transmitter pattern design. Further, a higher quantity of transmitters may destroy the assumption of zero mean range measurement noise assumption and result in higher noise and less position tracking accuracy.

In some embodiments, transmitter 112, transmitter 114, and/or transmitter 116 may transmit an acoustic signal, such as an ultrasonic signal. Transmitting device 102 may be any suitable ultrasonic device that includes one or more ultrasonic transducers to generate ultrasonic signals. Moreover, the ultrasonic signal may be a broadband ultrasonic signal. A signal range of the broadband ultrasonic signal may vary between, for example, around 25 and 70 KHz.

Transmitter 112 may be located near a top of the digital pen, transmitter 116 may be located near a writing element 118 of the digital pen, and transmitter 114 may be located between transmitters 112 and 116 along a length of the digital pen in close proximity to the writing element. The digital pen may have one or more switches and writing element 118 for writing on a surface and/or interacting with a touch screen device coupled to receiving device 104. Although one transmitter is illustrated as being near the top of the digital pen, other embodiments having more than one transmitter near the top of the digital pen are within the scope of this disclosure. A quantity of transmitters near the top of the digital pen, however, may be limited based on, for example, interference with other transmitters incorporated into the digital pen, bandwidth sharing, signal-to-noise ratio, and power consumption. Further, a length of the digital pen may be limited due to practical reasons such as manufacturability.

Receiving device 104 includes a plurality of receivers that may receive an acoustic signal emitted by transmitters 112, 114, and 116. Receiving device 104 includes receivers 122, 124, 126, and 128. Although four receivers are illustrated, other embodiments having fewer or more than four receivers are within the scope of this disclosure. A quantity of receivers may depend on the quantity of transmitters. For example, in some embodiments, the quantity of receivers is greater than the quantity of transmitters. Receiving device 104 may include any suitable acoustic receivers such as a microphone, and transmitting device 102 may transmit broadband ultrasonic signals to multiple microphones on receiving device 104. Receivers 122, 124, 126, and 128 may be microphones located on a mobile device.

Receiving device 104 may also include a processing component 132 and a memory 134. In some embodiments, processing component 132 may be one or more processors, central processing units (CPUs), image signal processors (ISPs), micro-controllers, or digital signal processors (DSPs), graphics processing units (GPUs), and audio signal processors, which may include analog and/or digital audio signal processors. Memory 134 may include a system memory component, which may correspond to random access memory (RAM), an internal memory component, which may correspond to read only memory (ROM), and an external or static memory, which may correspond to optical, magnetic, or solid-state memories, for example.

Memory 134 may correspond to a non-transitory machine-readable medium that includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which processing component 132 is capable of reading.

Further, memory 134 may include an application controller 142 and an application 144. Processing component 132 may determine a position of the digital pen and provide the determined position to application controller 142. Application controller 142 may affect operation of application 144 based on the determined position of the digital pen. In some embodiments, the position of the digital pen may be relative coordinates with respect to receiving device 104 and/or the receivers. Application 144 may then use the coordinates of the digital pen, for example, determine one or more user inputs.

In some embodiments, the digital pen may transmit an acoustic signal that may be detected by receiving device 104 and used by processing component 132 to derive a position of the digital pen. In particular, processing component 132 may track a position of each of the transmitters disposed on the digital pen. The position accuracy may be a key performance parameter for the digital pen and may be dependent on transducer placement, signal sequence design, and transducer acoustics (e.g., porting and signal-to-noise ratio).

The transmitters disposed on the digital pen consume power and it may be desirable to control the power used by these transmitters. A multiplexing technique may be used to properly control the power used by transmitters 112, 114, and 116. In some embodiments, transmitters 112, 114, and 116 transmit acoustic signals using Time Division Multiple Access (TDMA). Receiver 122 may receive at a first time slot a first ultrasonic signal from a first transmitter of transmitting device 102, receive at a second time slot a second ultrasonic signal from a second transmitter of transmitting device 102, and receive at a third time slot a third ultrasonic signal from a third transmitter of transmitting device 102. The transmission of signals at different time slots may reduce the interference noise.

In some embodiments, transmitters 112, 114, and 116 may transmit acoustic signals using multiplexing techniques different from TDMA. In an example, transmitters 112, 114, and 116 may transmit acoustic signals using Frequency Division Multiplexing (FDM). For example, receiver 122 may receive at a first frequency sub-band a first ultrasonic signal from a first transmitter of transmitting device 102, receive at a second frequency sub-band a second ultrasonic signal from a second transmitter of transmitting device 102, and receive at a third frequency sub-band a third ultrasonic signal from a third transmitter of transmitting device 102. In another example, transmitters 112, 114, and 116 may transmit acoustic signals using Phase Division Multiplexing (PDM). For example, receiver 122 may receive at a first phase of a channel a first ultrasonic signal from a first transmitter of transmitting device 102, receive at a second phase of the channel a second ultrasonic signal from a second transmitter of transmitting device 102, and receive at a third phase of the channel a third ultrasonic signal from a third transmitter of transmitting device 102.

The physical structure of the digital pen illustrated in FIG. 1 and the positioning of transmitter 112 near the top of the digital pen may be advantageous over other digital pens that do not have a transmitter near the top. For example, the transmitter near the top of the digital pen may bring the physical structure of the digital pen into a three-dimensional space. A digital pen including only transmitters near the writing element may enable a three-dimensional coordinate position of the digital pen tip to be determined. By including the transmitter near the top of the digital pen, the digital pen from the transmitter closest to the writing element to the transmitter near the top of the digital pen may be tracked and a three-dimensional coordinate position of the digital pen may be determined, as will be discussed in more detail below. Determining a three-dimensional coordinate of the digital pen is advantageous over determining a three-dimensional coordinate of merely the digital pen tip because it enables the position of the digital pen to be more accurately determined.

Another advantage of having the transmitter near the top of the digital pen may be that a clear line of sight (LOS) may be provided between at least one transmitter and receiver of the acoustic tracking system. At least one path between a transmitter and a receiver may be blocked as the user is writing with the digital pen because the transmitters near the pen tip are subject to hand and/or palm blocking of the signal path. The location of transmitter 112 near the top of the digital pen may provide for a clear line of sight between transmitter 112 and a receiver of receiving device 104, reducing the dependency of the user's pen motions. In some embodiments, at least one of the transmitters may be positioned to have a clear line of sight with the plurality of receivers of receiving device 104. Accordingly, the digital pen may be less prone to inaccurate pen position detections due to signal path blocking.

A digital pen having two transmitters near the writing element of the digital pen may be used to uniquely determine three-dimensional positioning of the pen tip, for example, a receiving device including four microphones. The position accuracy, however, is suboptimal for the digital pen having these two transmitters, especially for two-dimensional off-screen when using the digital pen along with a receiving device having a screen, and three-dimensional digital pen hover tracking with a larger z-axis distance between the top of the digital pen and the receiving device. The variance is greater in the z-direction, effectively increasing the error of variance of the geometric dilution of precision (GDOP).

The user may write "on-screen" by physically touching the digital pen with the receiving device (e.g., touch-sensitive screen of the receiving device). The user may write "off-screen" without physically touching the digital pen with the receiving device. For example, the user may write off-screen by moving the digital pen in the air or on a piece of paper in proximity to the receiving device.

As discussed previously, a digital pen having one or two transmitters in a tracking system that uses TOA to determine a position of the digital pen may have performance limitations and may have suboptimal accuracies with regards to tracking a position of the digital pen when a user uses the digital pen without having it in contact with the receiving device. Additional timing synchronization may be needed to mitigate the localization errors. Further, a digital pen having two transmitters close to the writing element of the digital pen may be thought of as lying in the same plane as the receiver plane (e.g., the screen of the receiving device). For example, the receiving device may include a touch-sensitive screen that corresponds to an x, y plane with z equal to zero. Due to the close proximity of these transmitters when the digital pen makes contact with the touch-sensitive screen, the two transmitters may be thought of as lying in the same plane as the receiver plane. The close proximity of the two transmitters to the touch-sensitive screen may cause inaccuracies when the user uses the digital pen for on-screen or off-screen writing. Although two transmitters are described as being close to the writing element, this description applies to digital pens having fewer than or more than two transmitters near the writing element.

In contrast, the location of transmitter 112 near the top of the digital pen increases the distance between the transmitter and the screen of the receiving device, effectively lowering the error of variance of the GDOP. For example, a digital pen having a transmitter located near the top of the digital pen as provided in the present disclosure may improve the accuracy of tracking the movement of the digital pen when the user uses the digital pen and may also increase robustness, especially in the off-screen case. Accordingly, in some embodiments transmitter 112 may be positioned to lie in a plane above the receiver plane (e.g., in the z-axis) and may increase the accuracy of determining the position of the digital pen in a multidimensional space. The multidimensional space may have three dimensions.

In some embodiments, the plurality of receivers may receive an acoustic signal from each of transmitters 112, 114, and 116 disposed in a fixed, non-planar relationship with respect to each other. Each transmitter may transmit a different acoustic signal pattern with respect to each other. In some embodiments, processing component 132 extracts acoustic signals received by each receiver of the plurality of receivers. For each acoustic signal received at a receiver, processing component 132 may determine which transmitter transmitted the respective acoustic signal. The received acoustic signals may be compared to an expected signal by processing component 132 according to instructions stored in memory 134 and an expected signal stored in memory 134 or generated by processing component 132, for example.

In some embodiments, processing component 132 may determine, based on the acoustic signals received at the plurality of receivers, a position of the digital pen by determining the positions of transmitters 112, 114, and 116 in a multidimensional space. Processing component 132 may be provided as hardware, software, or firmware, or combinations thereof in various embodiments.

Processing component 132 may calculate a time difference of arrival (TDOA) for each acoustic signal received at the plurality of receivers and apply a least square algorithm to determine the three-dimensional coordinate of the digital pen based on the determined transmitter. Processing component 132 may apply the least square algorithm to the one or more calculated time difference of arrivals to determine the position of the three transmitters. A position of the transmitting device in a multidimensional space having at least three dimensions may be determined based on the position of the three transmitters.

The TDOA of the acoustic signals may be used to determine (or estimate) the location of the digital pen (e.g., plurality of transmitters disposed on transmitting device 102). The application of TOA and the least square algorithm may improve the off-screen accuracy over other acoustic tracking systems. Although processing component 132 has been described as applying the least square algorithm, this is not intended to be limiting. Processing component 132 may apply other algorithms to determine a more accurate position of the digital pen. For example, the Kalman filter may be applied to determine a more accurate position of the digital pen.

Additionally, the different acoustic signal patterns may help to maintain a clear line of sight between the transmitters and receivers. Further, the location of transmitter 112 near the top of the digital pen may decrease the noise and provide a fast coordinate determination of the digital pen by providing an over-determined system with more equations to determine the position and more accurate tracking of the digital pen. Transmitter 112 may provide for more equations and less independent variables, resulting in an over-determined system.

Figure 2:
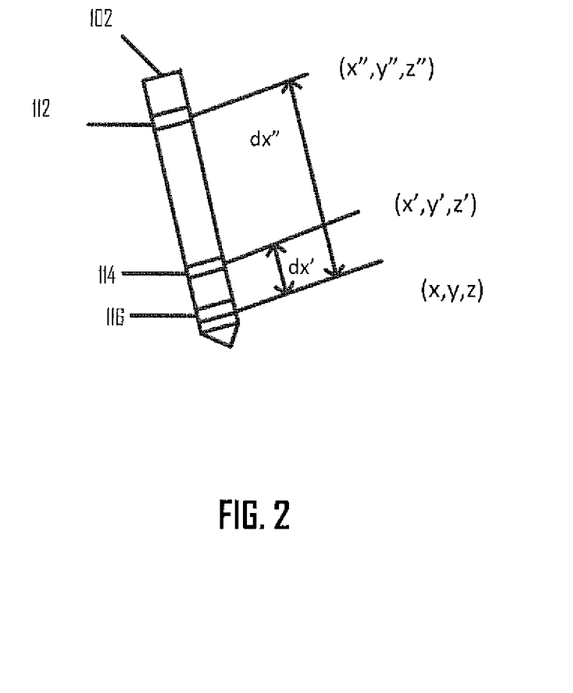
FIG. 2 is a diagram illustrating a transmitting device, according to an embodiment.

FIG. 2 is a diagram illustrating transmitting device 102, according to an embodiment. In FIG. 2, three-dimensional coordinate (x, y, z) is the coordinate of transmitter 116, three-dimensional coordinate (x', y', z') is the coordinate of transmitter 114, and three-dimensional coordinate (x", y", z") is the coordinate of transmitter 112. Further, a distance between transmitter 114 and transmitter 116 is dx', and a distance between transmitter 116 and 112 is dx".

In some embodiments, range measurements from the transmitters may be provided using the following equations. In an example, a first range measurement (e.g., distance between transmitter 116 and each of the N receivers) from transmitter 116 may be determined by the following equations R1, R2, R3, and R4:

$$R1 = \sqrt{(x-x1)^2 + (y-y1)^2 + (z-z1)^2} + vt + e1 \qquad (1),$$

$$R2 = \sqrt{(x-x2)^2 + (y-y2)^2 + (z-z2)^2} + vt + e2 \qquad (2),$$

$$R3 = \sqrt{(x-x3)^2 + (y-y3)^2 + (z-z3)^2} + vt + e3 \qquad (3),$$

$$R4 = \sqrt{(x-x4)^2 + (y-y4)^2 + (z-z4)^2} + vt + e4 \qquad (4),$$

Transmitter 116 is closest to writing element 118 of the transmitting device 102 compared to transmitters 112 and

114. Three-dimensional coordinate (x, y, z) in R1, R2, R3, and R4 is a position of transmitter 116 in a multidimensional space, where t is a time offset, v is a speed of sound that varies with air temperature, and $e_N$ is a range measurement of independent noise. Further, three-dimensional coordinate (xN, yN, zN) is a position of the Nth receiver (e.g., microphone). The first range measurement may be used as an input into the least square coordinate calculation.

Additionally, second range measurement (e.g., distance between transmitter 114 and each of the N receivers) from transmitter 114 may be determined by the following equations R5, R6, R7, and R8:

$$R5=\sqrt{(x'-x1)^2+(y'-y1)^2+(z'-z1)^2}+vt+e5 \tag{5},$$

$$R6=\sqrt{(x'-x2)^2+(y'-y2)^2+(z'-z2)^2}+vt+e6 \tag{6},$$

$$R7=\sqrt{(x'-x3)^2+(y'-y3)^2+(z'-z3)^2}+vt+e7 \tag{7},$$

$$R8=\sqrt{(x'-x4)^2+(y'-y4)^2+(z'-z4)^2}+vt+e8 \tag{8},$$

Transmitter 114 is located between transmitters 112 and 116 along a length of transmitting device 102. Three-dimensional coordinate (x', y', z') in R5, R6, R7, and R8 is a position of transmitter 114 in a multidimensional space, where t is a time offset, v is a speed of sound that varies with air temperature, and $e_N$ is a range measurement of independent noise. Further, three-dimensional coordinate (xN, yN, zN) is a position of the Nth receiver (e.g., microphone). The second range measurement may be used as an input into the least square coordinate calculation.

Additionally, a third range measurement (e.g., distance between transmitter 112 and each of the N receivers) from transmitter 112 may be determined by the following equations R9, R10, R11, and R12:

$$R9=\sqrt{(x''-x1)^2+(y''-y1)^2+(z''-z1)^2}+vt+e9 \tag{9},$$

$$R10=\sqrt{(x''-x2)^2+(y''-y2)^2+(z''-z2)^2}+vt+e10 \tag{10},$$

$$R11=\sqrt{(x''-x3)^2+(y''-y3)^2+(z''-z3)^2}+vt+e11 \tag{11},$$

$$R12=\sqrt{(x''-x4)^2+(y''-y4)^2+(z''-z4)^2}+vt+e12 \tag{12},$$

Transmitter 112 is farthest from writing element 118 compared to transmitters 114 and 116. Three-dimensional coordinate (x", y", z") in R9, R10, R11, and R12 is a position of transmitter 112 in a multidimensional space, where t is a time offset, v is a speed of sound that varies with air temperature, and $e_N$ is a range measurement of independent noise. Further, three-dimensional coordinate (xN, yN, zN) is a position of the Nth receiver (e.g., microphone). The third range measurement may be used as an input into the least square coordinate calculation. The three-dimensional coordinate (x, y, z) may be the result of the least square calculation using R1-R12 above as inputs.

In some embodiments, receiving device 104 may be embodied in a mobile device that includes a screen, and the screen may be at an angle relative to the ground. In an example, when receiving device 104 is tilted at an angle relative to, for example the ground or a table, the transmitters near the ground or table may reflect and cause complications. The location of transmitter 112 near the top of the digital pen may help reduce errors in determining the position of the digital pen.

Figure 3:
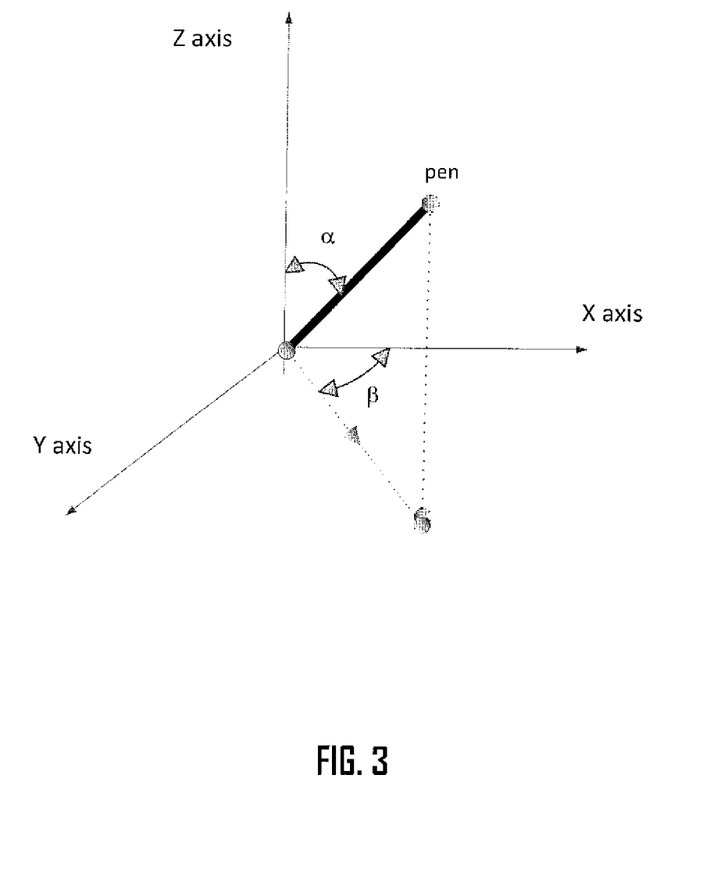
FIG. 3 is a diagram illustrating a tilt angle of a transmitting device, according to an embodiment.

In some embodiments, processing component 132 may determine a tilt angle of the digital pen, based on the determined position of one or more transmitters of transmitters 112, 114, and 116. FIG. 3 is a diagram illustrating a tilt angle of transmitting device 102, according to an embodiment. An angle between the digital pen and the z-axis may be referred to as an angle α. Further, an angle between the x-axis and a line segment perpendicular to the digital pen and extending from an origin of the coordinate system may be referred to as an angle β. As discussed in relation to FIG. 2, a first distance from transmitter 114 to transmitter 116 may be equivalent to $d_{x''}$, and a second distance from transmitter 112 to transmitter 116 may be equivalent to $d_{xx'}$, where, x' may be determined by the following equation:

$$x'=x+d_{xx}\sin(\alpha)\cos(\beta) \tag{13},$$

where, y' may be determined by the following equation:

$$y'=y+d_{xx}\sin(\alpha)\sin(\beta) \tag{14},$$

where, z' may be determined by the following equation:

$$z'=z+d_{xx}\cos(\alpha) \tag{15},$$

where, x" may be determined by the following equation:

$$x''=x+d_{x''}\sin(\alpha)\cos(\beta) \tag{16},$$

where, y" may be determined by the following equation:

$$y''=y+d_{x''}\sin(\alpha)\sin(\beta) \tag{17},$$

where, z" may be determined by the following equation:

$$z''=z+d_{x''}\cos(\alpha), \tag{18},$$ and where α and β are variable tilt angles of the transmitting device.

The coordinates (x', y', z') and (x", y", z") may be replaced with the coordinate (x, y, z) and a known $d_{x''}$ and $d_{xx'}$ value.

An over-determined system having eleven independent equations can solve the seven variables (x, y, z, v, t, α, β), and knowledge of (v, t) may be helpful in reducing the off-screen error effectively. Further, the position accuracy of transmitting device 102 is proportional to $1/\sqrt{N}$, where N is the number of independent range equations. The geometric dilution of precision (GDOP) accuracy gain may be $$\sqrt{\left(\frac{11}{7}\right)} \approx 1.25.$$

The x, y direction of the off-screen error may be greatly reduced and may be as accurate as a digital pen having two transmitters with a timing synchronization. Accordingly, the eleven over-determined equations may help improve the off-screen and on-screen errors to a certain degree without needing to calculate the absolute (v, t) value.

Acoustic tracking system 100 may improve both on-screen and off-screen accuracies of transmitting device 102 without including additional modules on receiving device 104. In some embodiments, processing component 132 may calculate a TDOA for each acoustic signal received at the plurality of receivers. Acoustic tracking systems that determine a position based on a TDOA may do so without using a synchronization channel. In this way, it may be unnecessary to add additional hardware to acoustic tracking system 100 and to modify software based on the additional hardware. Non-synchronized systems may use multiple receivers for receiving the emitted acoustical signal and calculating a Differential Time of Arrival ("DTOA") that is a time delay measured between the multiple receivers. To calculate the DTOA, rather than using equations (1)-(12) directly, the difference between each pair of the equations may be used in the coordinate calculations. For example, the difference between R1 and R2

(e.g., R1–R2) removes the vt offset from the parameter lists that are calculated. If a synchronization channel is used, however, the off-screen and on-screen accuracies may remain relatively consistent with an embodiment that calculates the TDOA for an acoustic signal.

Although TDOA is described to determine the position of a transmitter, this is not intended to be limiting and other techniques may be used. For example, an acoustic tracking system may determine the position of the transmitter based on a TOA that may be synchronized. Synchronized systems may use a synchronization signal that has a speed that is faster than the speed of sound and is transmitted to the receiver for synchronizing the clocks of the transmitter and receiver. Additional modules may be placed on receiving device 104 to receive the synchronization signal from the transmitters.

Based on the received signal, processing component 114 may calculate the TOF and may perform triangulation or other form of multilateration to determine the position of the transmitting device as a function of time. In synchronized acoustic signal-based position systems, an infrared (IR) signal may be used for synchronization due to its low cost and low power requirements. IR may be a cost effective, low power synchronization method. It may be difficult, however, to implement in the systems referred to above. For example, in a digital pen working on a screen of the handset or tablet, the handset or tablet may not include an IR receiver and it may be difficult to embed an IR receiver below the screen that has an acceptable signal sensitivity, for example such that the IR receiver is optically exposed to the exterior of the device. Even if an IR receiver is integrated within the system hardware, a dedicated hardware synchronization block may be required between the IR circuitry and audio processing circuitry of the device to maintain the required synchronization between the IR synchronization signal and the acoustic positioning signal.

Another synchronization signal that is commonly may be used is a radio wave synchronization signal. However, using a radio wave as a synchronization signal may still require a dedicated hardware synchronization block between the radio wave circuitry and the audio processing circuitry to maintain the required synchronization. Moreover, generating and receiving a radio wave synchronization signal may use more power than generating and receiving an IR signal. Accordingly, there is a need for an improved acoustic signal-based tracking system that has low power requirements, does not require dedicated synchronization hardware, and is easy to implement in a variety of electronic devices.

Figure 4:
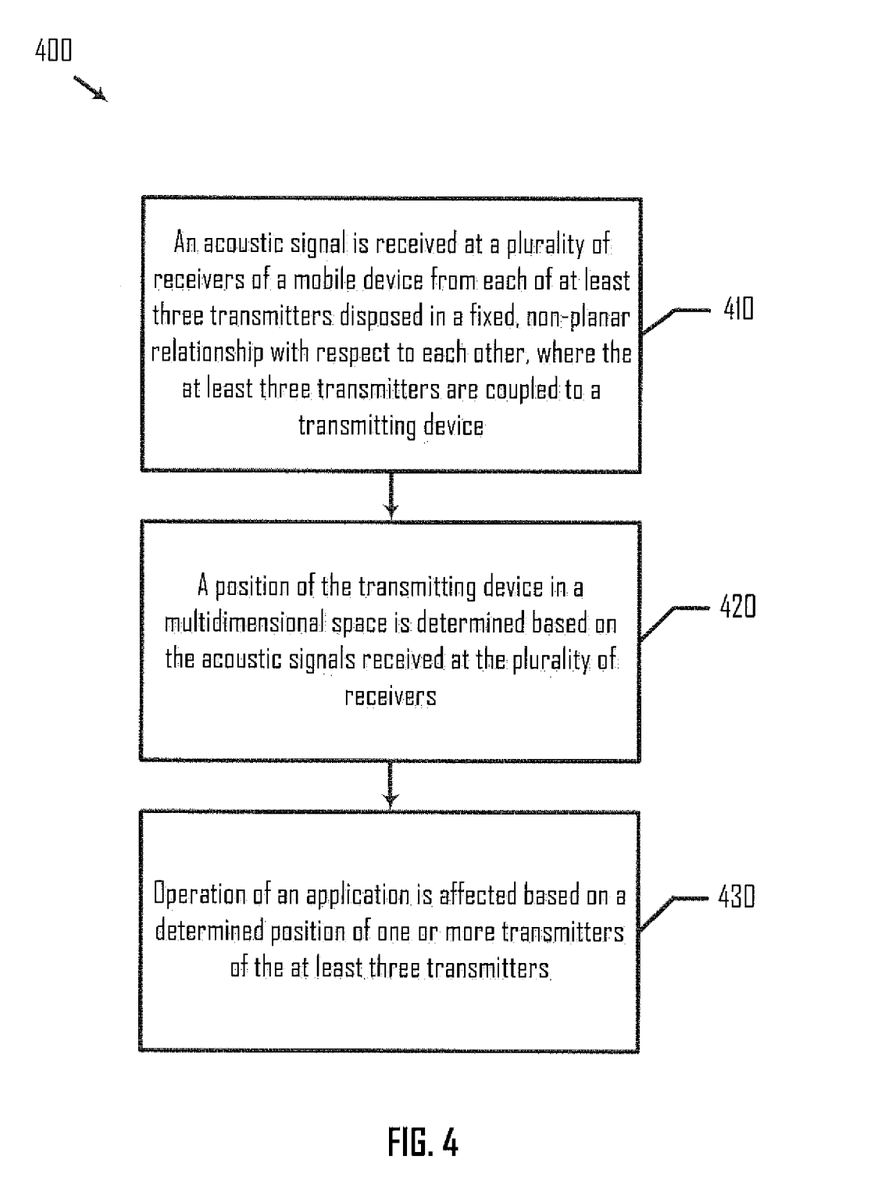
FIG. 4 is a flowchart illustrating a method of determining a position of a transmitting device, consistent with some embodiments.

FIG. 4 is a flowchart illustrating a method 400 of determining a position of a transmitting device, according to an embodiment. Method 400 is not meant to be limiting and may be used in other applications.

Method 400 includes blocks 410-430. In a block 410, an acoustic signal is received at a plurality of receivers of a mobile device from each of at least three transmitters disposed in a fixed, non-planar relationship with respect to each other, where the at least three transmitters are coupled to a transmitting device. In an example, receivers 122, 124, 126, and 128 may receive an acoustic signal from transmitters 112, 114, and 116 disposed in a fixed, non-planar relationship with respect to each other, where transmitters 112, 114, and 116 are coupled to transmitting device 102.

In a block 420, a position of the transmitting device in a multidimensional space is determined based on the acoustic signals received at the plurality of receivers. In an example, processing component 132 determines based on the acoustic signals received at receivers 122, 124, 126, and 128 a position of transmitting device 102 in a multidimensional space having at least three dimensions.

In a block 430, operation of an application is affected based on a determined position of one or more transmitters of the at least three transmitters. In an example, application controller 142 affects operation of application 144 based on a determined position of one or more transmitters of transmitters 112, 114, and/or 116.

It is also understood that additional processes may be performed before, during, or after blocks 410-430 discussed above. For example, method 400 may include a process of extracting acoustic signals received by each receiver of the plurality of receivers. It is also understood that one or more of the blocks of method 400 described herein may be omitted, combined, or performed in a different sequence as desired.

One skilled in the art may readily devise other systems consistent with the disclosed embodiments which are intended to be within the scope of this disclosure. The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. An acoustic tracking system, comprising:
  a mobile device including a plurality of receivers that receives an acoustic signal from each of at least three transmitters disposed in a fixed, non-planar relationship with respect to each other, wherein the at least three transmitters are coupled to a transmitting device;
  a processing component that determines, based on the acoustic signals received at the plurality of receivers, a position of the transmitting device in a multidimensional space; and
  an application controller that affects operation of an application based on a determined position of one or more transmitters of the at least three transmitters.

2. The acoustic tracking system of claim 1, further comprising:
  a digital pen, wherein the at least three transmitters are disposed on the digital pen.

3. The acoustic tracking system of claim 2, wherein a first transmitter of the at least three transmitters is located near a top of the digital pen.

4. The acoustic tracking system of claim 1, further comprising:
  a transmitting device, wherein the at least three transmitters are disposed on the transmitting device.

5. The acoustic tracking system of claim 4, wherein the processing component determines based on the determined position of one or more transmitters of the at least three transmitters a tilt angle of the transmitting device.

6. The acoustic tracking system of claim 5, wherein the tilt angle comprises variable tilt angles $\alpha$ and $\beta$, and the variable tilt angles $\alpha$ and $\beta$ of the transmitting device is determined based on the following equations:

$$x'=x+d_{xx}\sin(\alpha)\cos(\beta),$$

$$y'=y+d_{xx}\sin(\alpha)\sin(\beta),$$

$$z'=z+d_{xx}\cos(\alpha),$$

$$x''=x+d_{x'}\sin(\alpha)\cos(\beta),$$

$y''=y+d_{x''}\sin(\alpha)\sin(\beta)$, $z''=z+d_{x''}\cos(\alpha)$, and wherein $d_{x''}$ is a first distance from the first transmitter to the second transmitter, $d_{xx'}$ is a second distance from the third transmitter to the first transmitter, and (x', y', z') and (x'', y'', z'') are coordinates corresponding to the determined position of the one or more transmitters.

7. The acoustic tracking system of claim 6,
wherein a second range measurement from the second transmitter is determined by equations R5, R6, R7, and R8:

$R5 = \sqrt{(x'-x1)^2+(y'-y1)^2+(z'-z1)^2}+vt+e5$, $R6 = \sqrt{(x'-x2)^2+(y'-y2)^2+(z'-z2)^2}+vt+e6$, $R7 = \sqrt{(x'-x3)^2+(y'-y3)^2+(z'-z3)^2}+vt+e7$, $R8 = \sqrt{(x'-x4)^2+(y'-y4)^2+(z'-z4)^2}+vt+e8$, wherein the second transmitter is located between the first and third transmitters along a length of the digital pen, and (x, y, z) in R5, R6, R7, and R8 is a position of the second transmitter in the multidimensional space,
wherein a third range measurement from the third transmitter is determined by equations R9, R10, R11, and R12:

$R9 = \sqrt{(x''-x1)^2+(y''-y1)^2+(z''-z1)^2}+vt+e9$, $R10 = \sqrt{(x''-x2)^2+(y''-y2)^2+(z''-z2)^2}+vt+e10$, $R11 = \sqrt{(x''-x3)^2+(y''-y3)^2+(z''-z3)^2}+vt+e11$, $R12 = \sqrt{(x''-x4)^2+(y''-y4)^2+(z''-z4)^2}+vt+e12$, and wherein the third transmitter is farthest from the writing element compared to the first and second transmitters, and (x, y, z) in R9, R10, R11, and R12 is a position of the third transmitter in the multidimensional space.

8. The acoustic tracking system of claim 4, wherein a first range measurement from a first transmitter of the at least three transmitters is determined by equations R1, R2, R3, and R4:

$R1 = \sqrt{(x-x1)^2+(y-y1)^2+(z-z1)^2}+vt+e1$, $R2 = \sqrt{(x-x2)^2+(y-y2)^2+(z-z2)^2}+vt+e2$, $R3 = \sqrt{(x-x3)^2+(y-y3)^2+(z-z3)^2}+vt+e3$, $R4 = \sqrt{(x-x4)^2+(y-y4)^2+(z-z4)^2}+vt+e4$, wherein the first transmitter is closest to a writing element of the transmitting device compared to a second transmitter and a third transmitter of the at least three transmitters,
wherein (x, y, z) in R1, R2, R3, and R4 is a position of the first transmitter in a multidimensional space,
wherein t is a time offset,
wherein v is a speed of sound that varies with air temperature, and
wherein $e_N$ is a range measurement of independent noise.

9. The acoustic tracking system of claim 1, wherein the plurality of receivers receive broadband ultrasonic signals.

10. The acoustic tracking system of claim 9, wherein the broadband ultrasonic signals have a frequency range between 25 KHz and 70 KHz.

11. The acoustic tracking system of claim 1, wherein the processing component extracts acoustic signals received at each receiver of the plurality of receivers and determines which transmitter transmitted the respective acoustic signal.

12. The acoustic tracking system of claim 11, wherein the processing component calculates a time difference of arrival for each acoustic signal received at the plurality of receivers.

13. The acoustic tracking system of claim 12, wherein the processing component applies a least square algorithm to the one or more calculated time difference of arrivals to determine the position of the at least three transmitters.

14. The acoustic tracking system of claim 1, wherein the mobile device includes a screen, and the screen is at an angle relative to a ground.

15. The acoustic tracking system of claim 1, wherein the mobile device is at least one of a smartphone, tablet computer, personal digital assistant, and laptop.

16. The acoustic tracking system of claim 1, wherein the multidimensional space includes a three-dimensional space.

17. A method of determining a position of a transmitter, comprising:
receiving, at a plurality of receivers, an acoustic signal from each of at least three transmitters disposed in a fixed, non-planar relationship with respect to each other, the at least three transmitters being coupled to a transmitting device;
determining, based on the acoustic signals received at the plurality of receivers, a position of the transmitting device in a multidimensional space; and
affecting operation of an application based on a determined position of one or more transmitters of the at least three transmitters.

18. The method of claim 17, wherein the at least three transmitters are disposed on a digital pen.

19. The method of claim 18, wherein a first transmitter of the at least three transmitters is located near a top of the digital pen.

20. The method of claim 17, further comprising:
determining based on the determined position of one or more transmitters of the at least three transmitters a tilt angle of the digital pen.

21. The method of claim 17, wherein the receiving at a plurality of receivers an acoustic signal includes receiving at the plurality of receivers an ultrasonic signal and the determining includes determining based on the ultrasonic signals received at the plurality of receivers the position of the transmitting device in the multidimensional space having at least three dimensions.

22. The method of claim 21, wherein the receiving at the plurality of receivers an ultrasonic signal includes receiving at the plurality of receivers a broadband ultrasonic signal having a frequency range between 25 KHz and 70 KHz.

23. The method of claim 17, wherein the receiving includes receiving at a plurality of microphones the acoustic signal from each of the at least three transmitters.

24. The method of claim 23, wherein the plurality of microphones includes four or more microphones.

25. The method of claim 17, wherein the plurality of receivers is located on a mobile device.

26. The method of claim 25, wherein the mobile device is at least one of a smartphone, tablet computer, personal digital assistant, and laptop.

27. The method of claim 17, wherein at least one of the transmitters is positioned to have a clear line of sight with the plurality of receivers.

28. The method of claim 17, wherein each of the at least three transmitters transmits acoustic signals using Time Division Multiple Access.

29. The method of claim 28, wherein the receiving includes receiving at a first time slot a first acoustic signal from the first transmitter, receiving at a second time slot a second acoustic signal from the second transmitter, and receiving at a third time slot a third acoustic signal from the third transmitter.

30. The method of claim 17, further comprising:
extracting acoustic signals received by each receiver of the plurality of receivers;
for each acoustic signal received at a receiver of the plurality of receivers, determining which transmitter transmitted the respective acoustic signal;
calculating a time difference of arrival for each acoustic signal received at the plurality of receivers; and
applying a least square algorithm to the one or more time difference of arrivals to determine the position of the transmitting device in the multidimensional space.

31. The method of claim 17, wherein the plurality of receivers is coupled to a device having a screen, and the screen is at an angle relative to a ground.

32. The method of claim 17, wherein the multidimensional space includes a three-dimensional space.

33. A non-transitory computer-readable medium having stored thereon computer-executable instructions for performing operations, comprising:
receiving, at a plurality of receivers, an acoustic signal from each of at least three transmitters disposed in a fixed, non-planar relationship with respect to each other, the at least three transmitters being coupled to a transmitting device;
determining, based on the acoustic signals received at the plurality of receivers, a position of the transmitting device in a multidimensional space; and
affecting operation of an application based on a determined position of one or more transmitters of the at least three transmitters.

34. An apparatus for executing multiple instructions in one or more slots, comprising:
means for receiving, at a plurality of receivers, an acoustic signal from each of at least three transmitters disposed in a fixed, non-planar relationship with respect to each other, the at least three transmitters being coupled to a transmitting device;
means for receiving determining, based on the acoustic signals received at the plurality of receivers, a position of the transmitting device in a multidimensional space; and
means for receiving affecting operation of an application based on a determined position of one or more transmitters of the at least three transmitters.

* * * * *